US012433732B2

(12) United States Patent
Klein

(10) Patent No.: US 12,433,732 B2
(45) Date of Patent: Oct. 7, 2025

(54) LIVESTOCK EMASCULATOR

(71) Applicant: E. Chad Klein, Stephenville, TX (US)

(72) Inventor: E. Chad Klein, Stephenville, TX (US)

( * ) Notice: Subject to any disclaimer, the term of this patent is extended or adjusted under 35 U.S.C. 154(b) by 345 days.

(21) Appl. No.: 18/172,010

(22) Filed: Feb. 21, 2023

(65) Prior Publication Data

US 2023/0200963 A1 Jun. 29, 2023

(51) Int. Cl.
*A61D 1/06* (2006.01)

(52) U.S. Cl.
CPC .................................... *A61D 1/06* (2013.01)

(58) Field of Classification Search
CPC .. A61D 1/00; A61D 1/06; A22C 17/00; A22C 17/0006; A22C 25/025; B26B 3/00; B26B 3/03; B26B 3/08; B26B 5/00; B26B 5/002; B26B 5/005; B26B 5/006; B26B 5/007; B26B 5/008; B26B 11/00; B26B 11/005; B26B 11/006; B26B 27/00; B26B 27/005; B26B 29/02
See application file for complete search history.

(56) References Cited

U.S. PATENT DOCUMENTS

2021/0023727 A1 * 1/2021 Yu Chen ................ B26B 5/005

FOREIGN PATENT DOCUMENTS

WO WO-2013059854 A1 * 5/2013 ............ A01K 13/00

* cited by examiner

*Primary Examiner* — Robert A Lynch
(74) *Attorney, Agent, or Firm* — James E. Walton

(57) ABSTRACT

A tool for the emasculation of livestock includes a handle portion, a head portion, a securement member, and at least one cutting member. The head portion is coupled the handle portion and includes a body section and an arm section extending away from the body section. The cutting member is disposed between the head portion and the securement member.

12 Claims, 7 Drawing Sheets

LIVESTOCK EMASCULATOR

BACKGROUND

1. Field of the Invention

The present application relates to livestock working devices. In particular, the present application relates to a device designed for the emasculation of livestock.

2. Description of Related Art

Presently, there are some tools that are designed for use in the working of livestock. Such tools and devices are often made of plastic and can include blades. As these tools and devices are often used in rough outdoor environments, they are exposed to substantial wear and tear. The blades wear out, the plastic portions break, or portions of the tool dry rot, resulting in the need to replace the device.

As such, many shortcomings remain in the aforementioned devices for the emasculation of livestock in the field of working livestock.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
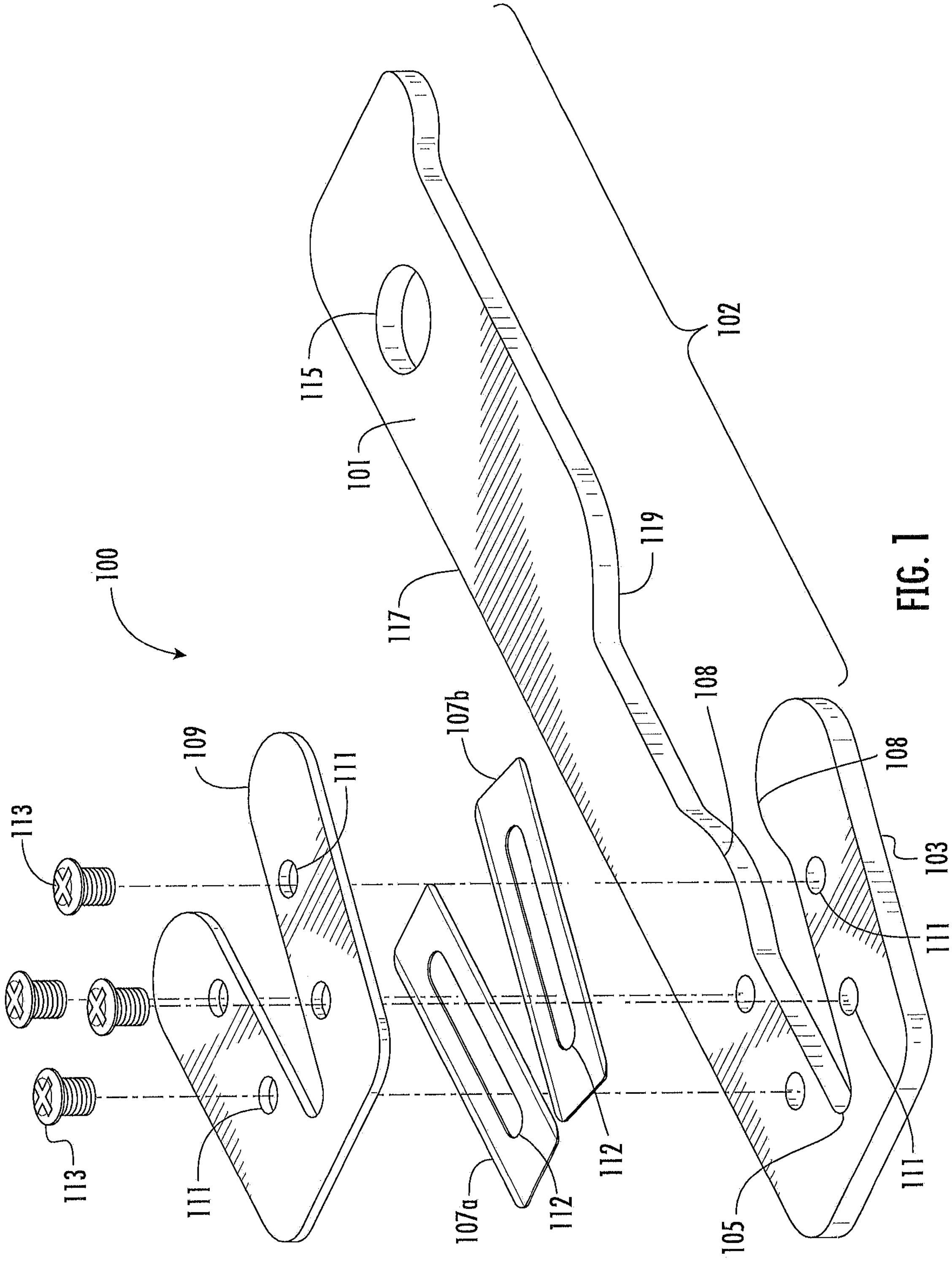
FIG. 1 is an exploded view of a livestock emasculation device according to a preferred embodiment of the present invention.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the livestock emasculator according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a livestock emasculator is illustrated according to a preferred embodiment of the present invention. Emasculator 100 preferably includes base member 101, blades 107*a*/107*b*, and securement member 109. Under the preferred embodiment, base member 101 is a single piece made of a metal material. However, alternative embodiments may utilize multiple pieces secured together to form the base member 101. Additionally, alternative embodiments of the livestock emasculator may be made of a variety of alternative materials that are rigid in form. For example, a hard plastic may be molded to form the present invention as shown herein or with some close variations of the disclosure herein.

Base member 101 preferably includes handle portion 102, head portion 103, and cutting slot 105. Handle portion 102 has outside edge 117 and inside edge 119 on opposing sides. Under the preferred embodiment, outside edge 117 is substantially planar while inside edge 119 has several curves including an outward curve to create a knob effect on the end of the handle portion 102. As a whole, the handle portion 102 is preferably configured to comfortably fit the hand of a user of the device. As such, there may be alternative embodiments with variances in the curved and planar portions of the edges. For example, a user could have a custom fit handle portion to perfectly fit their own hand. Another example may have varying sizes, such as small/medium/large, to fit standard hand sizes. Although handle portion 102 is illustrated as being made from the same type of material as the head portion 103, it should be appreciated that alternative embodiments may utilize a material providing better grip or comfortability. Handle portion also preferably includes an aperture 115. Aperture 115 may be configured such that other hooks, clips, rings, lanyards, or other attachment mechanisms may be connected to emasculator 100 for purposes such as storage or carrying. For example, a person needing the tool may have a clip on their belt loop that they can attach the tool to when they are not actively using the tool. In other situations, a hook on a nearby structure may be utilized to hang the tool while not actively being used. It should be appreciated that alternative embodiments of the present invention may not include aperture 115, or may include alternative forms, such as different shapes, sizes, and number of apertures.

Under the preferred embodiment, head portion 103 is adjacent the handle portion 102, together formed of one rigid piece. It should be appreciated that alternative embodiments may have a separate head portion that is formed independent of the handle portion and then coupled together. Head portion 103 preferably includes a body section coupled to handle portion 102 and an arm section extending away from the body section, such that cutting slot 105 is defined in between the body section and the arm section. Cutting slot has a roughly V-shaped curve near one end, with an open portion on the opposing end. Said cutting slot may vary in shape and size in alternative embodiments of the present invention, while ideally maintaining compatibility with blades 107*a* and 107*b*, which will be further detailed below.

Head portion 103 preferably includes a plurality of apertures 111, which are configured to be compatible with fasteners 113, such that blades 107*a*/107*b* are held securely.

Under the preferred embodiment, blades 107*a*/107*b* are sized to rest upon head portion 103, one on the body section and one on the arm section. Under the preferred embodiment, blades 107*a*/107*b* are configured as carpet cutting blades, being substantially rectangular with an elongated aperture 112 disposed in the middle. Aperture 112 is generally an elongated rectangular shape with rounded ends, although it should be appreciated that alternative embodiments may have variances in aperture size and shape. For example, blades 107*a*/107*b* may have multiple circular apertures on each blade that coincide with each aperture 111. It should further be appreciated that alternative embodiments of the present invention may include alternative blade shapes, such as the blades present in the alternative embodiment illustrated in FIG. 7 and described below. It should be appreciated that blades 107*a*/107*b* may be replaced with other cutting members configured for operation within the cutting slot. Head portion 103 also preferably includes extended edges 108, which are outward rounded curves disposed in a position such that a corner edge of blades 107*a*/107*b* rest upon opposing extended edges. Such configuration aids in preventing accidental or unwanted cuts by the corner of the blades. Some alternative embodiments of the present invention may also include additional extended edges on portions of the securement member 109.

Under the preferred embodiment, blades 107*a*/107*b* are disposed in a position on head portion 103, such that apertures 111 are accessible via apertures 112. Securement member 109 is preferably configured to rest upon the blades 107*a*/107*b* and head portion 103, such that the blades are sandwiched between securement member 109 and head portion 103. Securement member 109 preferably also includes apertures 111 that correspond to the apertures 111 of the head portion. Fasteners 113 are configured to correspond to an individual aperture, such that when assembled, fasteners pass through securement member 109, blades 107, and head portion 103. Such configuration secures the blades 107*a*/107*b* in place for use of the system, while also allowing for efficient replacement of the blades when needed after normal wear and tear. Under the preferred embodiment, the fasteners are countersunk; however, it should be appreciated that a variety of fastening methods may be used in alternative embodiments of the present invention.

It should be appreciated that alternative embodiments of the present invention may include various methods for securing the blades to the system. For example, instead of fasteners, a clip or snap on method may be used to hold the blades in place. In additional alternative embodiments, different sizes and types of fasteners may be used. Additionally, it should be appreciated that the overall size and shape of the emasculator may vary in alternative embodiments. For example, the base member 101 may be bent or angled in a way that allows for more comfortability for the user and for workability in various environments. They base member may even include adjustment capabilities such that the angles of the tool may be adjusted at any point by the user.

Figure 2:
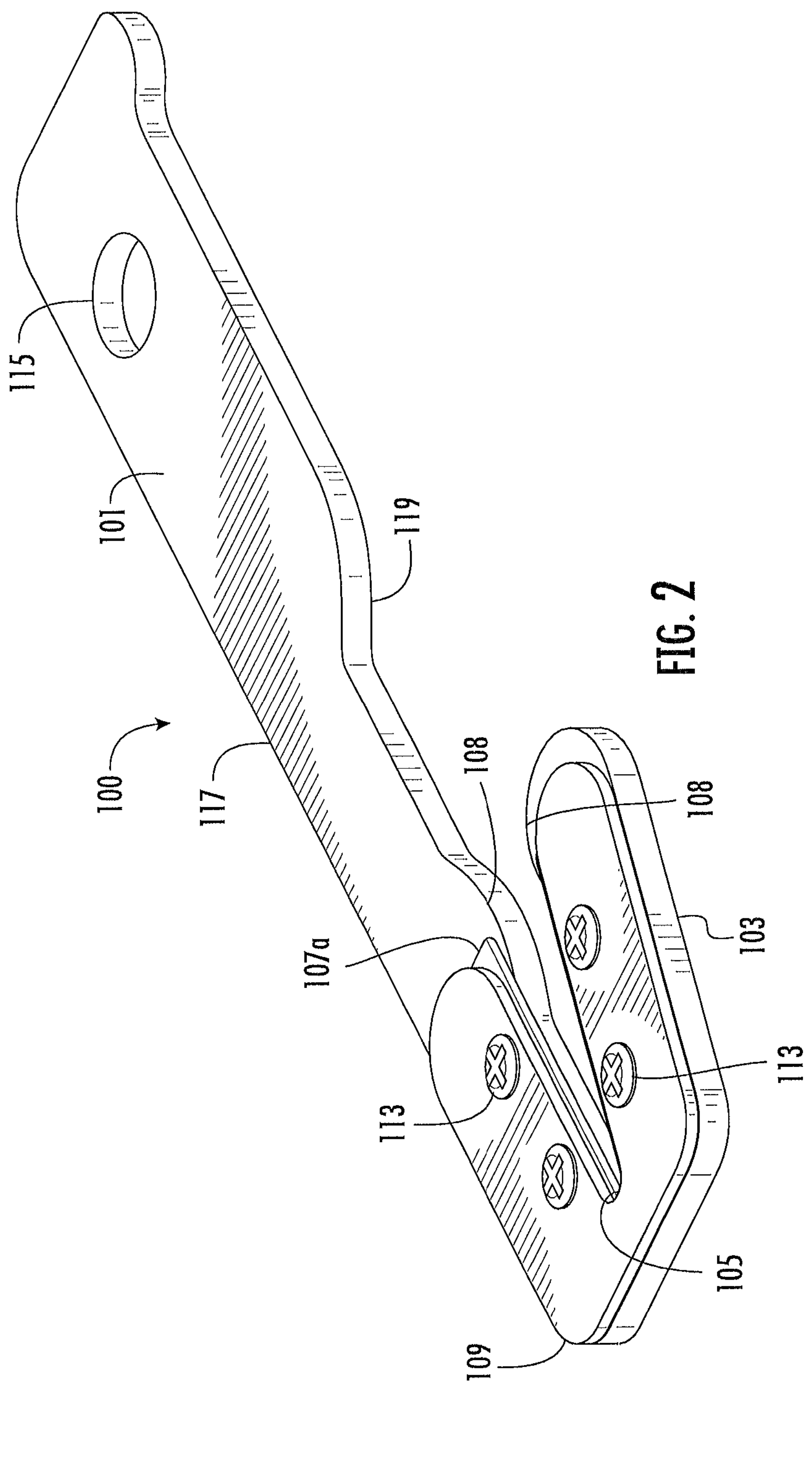
FIG. 2 is a perspective view of the livestock emasculation device of FIG. 1.

Referring now also to FIG. 2 in the drawings, the livestock emasculator 100 is illustrated in a fully assembled form, according to a preferred embodiment of the present invention. As shown in FIG. 2, blade 107*a* is not fully concealed between head portion 103 and securement member 109, but rather extends slightly beyond the edges of said segments. Such configuration creates blade contact points within cutting slot 105, wherein the emasculator 100 is used to cut objects placed within the cutting slot 105, such as a livestock animal's scrotum. As disclosed above, it should be appreciated that alternative blades may be used, which may result in varying portions and amounts of the blade that extend into the cutting slot.

Figure 3:
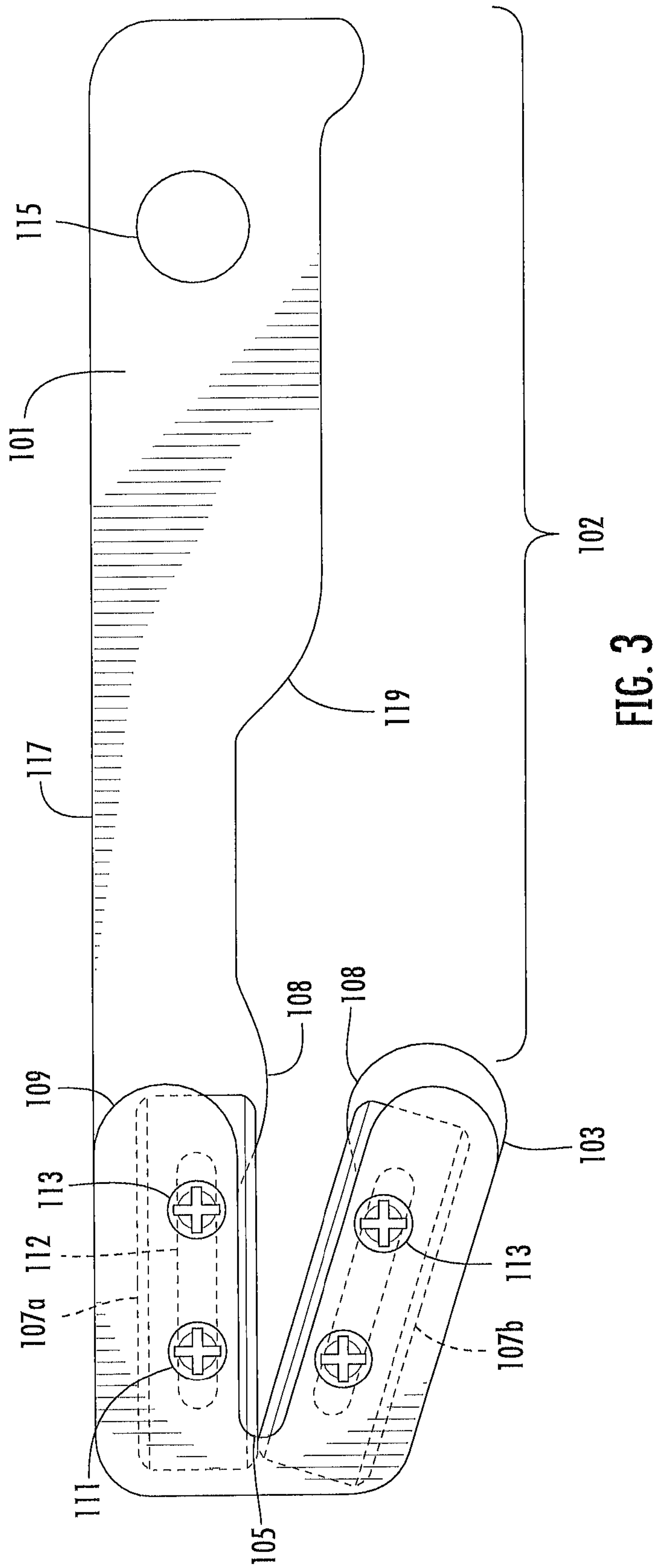
FIG. 3 is a top view of the livestock emasculation device of FIG. 1.

Referring now also to FIG. 3 in the drawings, a top view of emasculator 100 is illustrated. FIG. 3 best illustrates the preferable positioning of blades 107*a*/107*b*. The dashed lines of blades 107*a*/107*b* represent the portions of the blades that are concealed between head portion 103 and securement member 109. The solid lines of blades 107*a*/107*b* represent exposed portions of the blades that are configured, such that cutting slot 105 has blade contact points on both sides. Extended edges 108 preferably extend beyond a corner edge of the blades 107*a*/107*b*, so as to have an extra safety measure for reducing likelihood of incidental blade contact and injury.

It should be appreciated that various configurations of the blades may be present in alternative embodiments of the present invention. For example, some embodiments may have a recessed area in the head portion 103 and/or securement member 109, routed as the shape and size of the blade, such that the blade rests flush with a surface of said member and is held in place during installation, rather than only resting on top of/against the surface. Alternative embodiments may also include variances in extended edges 108, or even may remove the extended edges. If the extended edges are removed, alternative safety measures may be included, such as a cap or edge member configured for preventing unwanted cuts.

Figure 4:
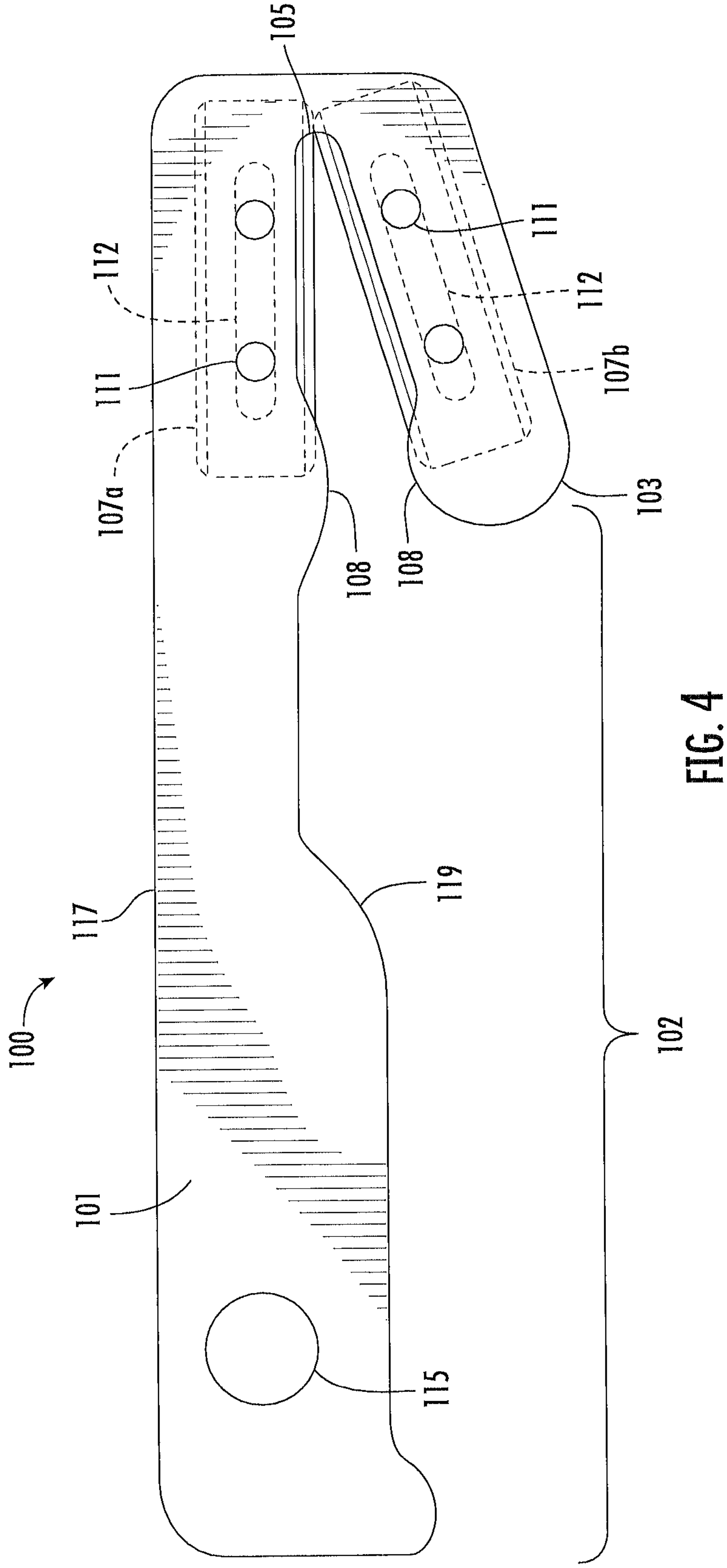
FIG. 4 is a bottom view of the livestock emasculation device of FIG. 1.

Referring now also to FIG. 4 in the drawings, a bottom view of emasculator 100 is illustrated. FIG. 4 best illustrates the exposed portions of blades 107*a*/107*b*, and how extended edges 108 are configured for protected against unwanted blade contact. It should be appreciated that variations in size and shape of blades 107*a*/107*b*, head portion 103, and extended edges 108 will cause variations in exact blade disposition for alternative embodiments of the present invention.

Figure 5:
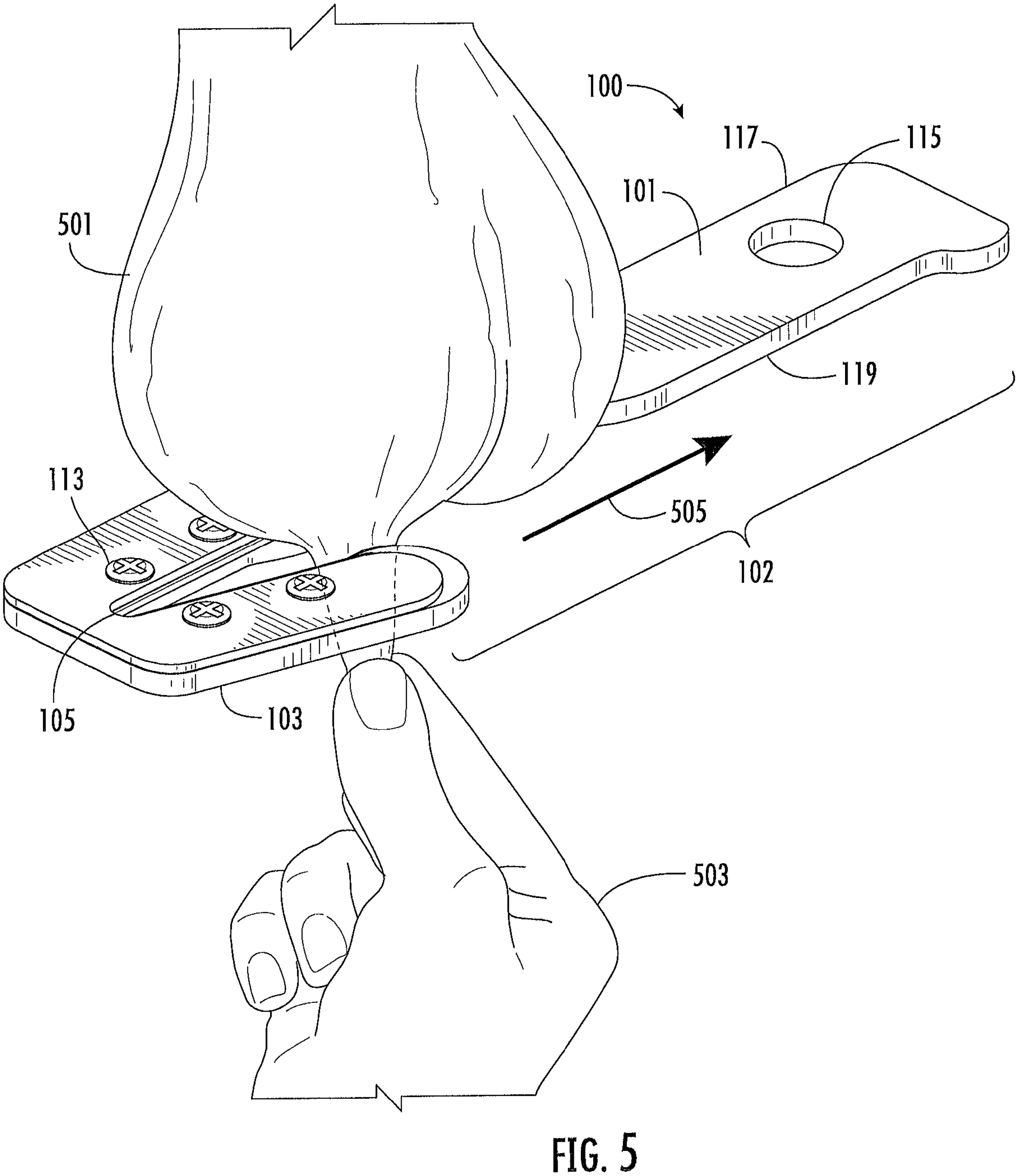
FIG. 5 is a perspective view of the livestock emasculation device of FIG. 1 in use.

Referring now also to FIG. 5 in the drawings, a perspective view of emasculator 100 being used to cut the scrotum of an animal is illustrated. Under the preferred embodiment, when utilizing the livestock emasculator, a piece of animal scrotum 501 is pulled by a worker 503 so as to cause an extension of skin that may fit into cutting slot 105. The emasculator 100 is then moved in the direction of reference arrow 505, causing a cut to be made in animal scrotum 501 by blades 107*a*/107*b*. Once the cut has been made, the worker then removed the animal's testicles through the cut, resulting in the emasculation of the animal. It should be understood that FIG. 5 is illustrative of the use of the present invention, and that alternative embodiments may be used that vary in size and positioning of the device.

Figure 6:
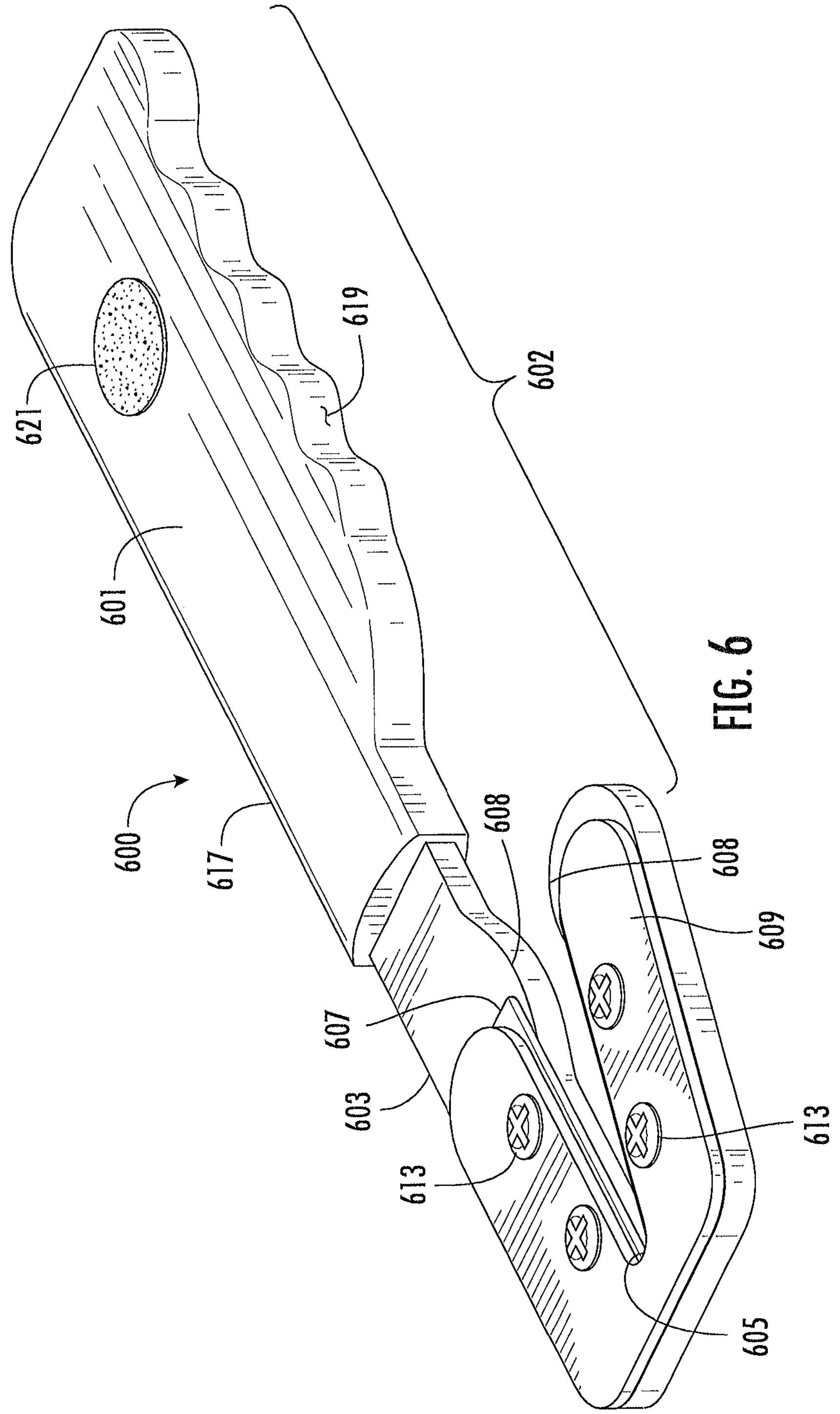
FIG. 6 is a perspective view of a livestock emasculation device according to an alternative embodiment of the present invention.

Referring now also to FIG. 6 in the drawings, a livestock emasculator is illustrated according to an alternative embodiment of the present invention. Emasculator 600 includes base member 601, blades 607, and securement member 609. Base member 601 preferably includes handle portion 602, head portion 603, and cutting slot 605. The above listed elements of the emasculator 600 are substantially similar to the correspondingly named elements of emasculator 100; however, handle portion 602 and head portion 603 do not flushly connect as an integral piece in the same manner as handle portion 102 and head portion 103. Instead, head portion 603 is smaller than handle portion 602 and has right angle corners. As described above in relation to emasculator 100, it should be understood that handle portion 602 and head portion 603 may be form as one singular piece, or as separate pieces, either permanently coupled together or detachably distinct.

Cutting slot 605, securement member 609, extended edges 608, and fasteners 613 are all substantially similar to the identically named elements of emasculator 100. Additionally, emasculator 600 includes apertures (not shown) in the head portion 603, blades 607, and securement member 609 that correspond with an associated fastener 613 for securing the tool together. It should be appreciated that alternative embodiments may include configurations that require more or less fasteners or alternatively positioned fasteners, and would thus require more or less corresponding apertures.

Handle portion 602 has a generally straight outside edge 617 and an inside edge 619 having multiple curves. Although alternative embodiments can include various shaped curves on inside edge 619, emasculator 600 has an inside edge 619 configured to have a user's fingers rest comfortably on separate curved portions of the handle as the user is gripping the tool. Handle portion 602 also includes an optional magnet 621. Magnet 621 is preferably located on an external surface of the handle, such that the tool may be magnetically coupled to a nearby object, such as a metal gate or fence, when the user of the tool is not actively needing the tool. It should be appreciated that alternative embodiments may include various sizes and shapes for the magnet, or different positions and number of magnets. For example, there may be a magnet on each side of the handle. Additionally, it is possible to have an internal magnet, so long as the magnetic force is strong enough to hold the tool in position when coupled to a surface.

Figure 7:
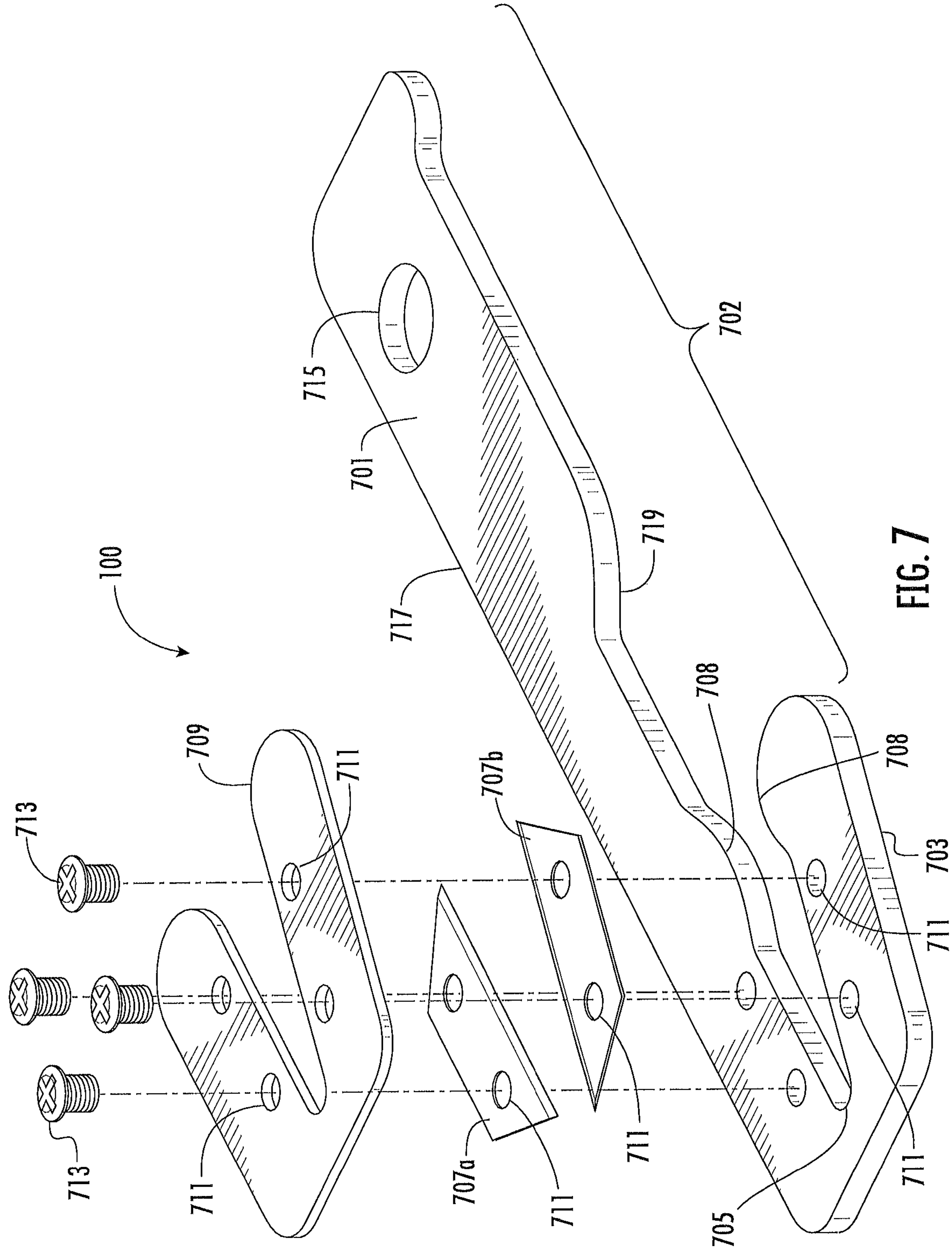
FIG. 7 is an exploded view of a livestock emasculation device according to an alternative embodiment of the present invention.

Referring now also to FIG. 7 in the drawings, a livestock emasculator is illustrated according to an alternative embodiment of the present invention. Emasculator 700 is substantially similar to emasculator 100. Emasculator 700 preferably includes base member 701, handle portion 702, head portion 703, cutting slot 705, extended edges 708, securement member 709, apertures 711, fasteners 713, aperture 715, outside edge 717, and inside edge 719; all of these elements fit the descriptions of the identically named elements of emasculator 100. However, blades **707*a*/707*b* differ from blades 107*a*/107*b* in the alternative embodiment of FIG. 7. Instead of rectangular carpet-cutting type blades, blades 707*a*/707*b* are trapezoidal shaped, with two apertures 711 present in each blade, such that fasteners 713 may be placed through the apertures 711** to secure the blades within the system. It should be appreciated that blade size and shape may vary in alternative embodiments of the present invention, and that the embodiments shown herein may be combined into further alternative embodiments, including some features from each embodiment described herein.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A tool for emasculation of livestock, comprising:

a handle portion;

a head portion coupled to the handle portion, the head portion comprising:

a body section;

an arm section extending away from the body section; and a cutting slot defined between the body section and the arm section;

a securement member;

at least one cutting member disposed between the head portion and the securement member;

at least two extended edges, one extending from the body section and one extending from the arm section, the at least two extended edges extending partially across an opening into the cutting slot; and wherein a sharp corner edge of the at least one cutting member is positioned on a top surface of the at least two extended edges to minimize exposure of the sharp corner edge.

2. The tool of claim 1, wherein the at least one cutting member comprises:

a first blade disposed on the body section of the head portion; and a second blade disposed on the arm section of the head portion.

3. The tool of claim 2, wherein the first blade and the second blade are each carpet cutting blades.

4. The tool of claim 1, wherein the handle portion, the head portion, and the securement member are made of a metal material.

5. The tool of claim 1, wherein the handle portion comprises:

a generally planar outside edge; and an inside edge having a plurality of curves.

6. The tool of claim 5, wherein the plurality of curves are configured to correspond to a tool user's fingers.

7. The tool of claim 5, wherein the body section comprises:

a generally planner outside edge.

8. The tool of claim 7, wherein the outside edge of the body section is planar with the outside edge of the handle portion.

9. The tool of claim 1, further comprising:

a magnet coupled to the handle portion.

10. The tool of claim 1, wherein the handle portion and the head portion are formed from a single piece of material.

11. The tool of claim 1, further comprising:

a plurality of apertures, at least one aperture on each of the head portion, the cutting member, and the securement member;

wherein the plurality of apertures correspond to each other, such that a fastener can be used to securely couple the head portion, the cutting member, and the securement member to each other.

12. The tool of claim 1, further comprising:

an aperture disposed through the handle portion, the aperture being configured to receive an attachment mechanism to store or carry the tool.

* * * * *